United States Patent Office 3,328,097
Patented June 27, 1967

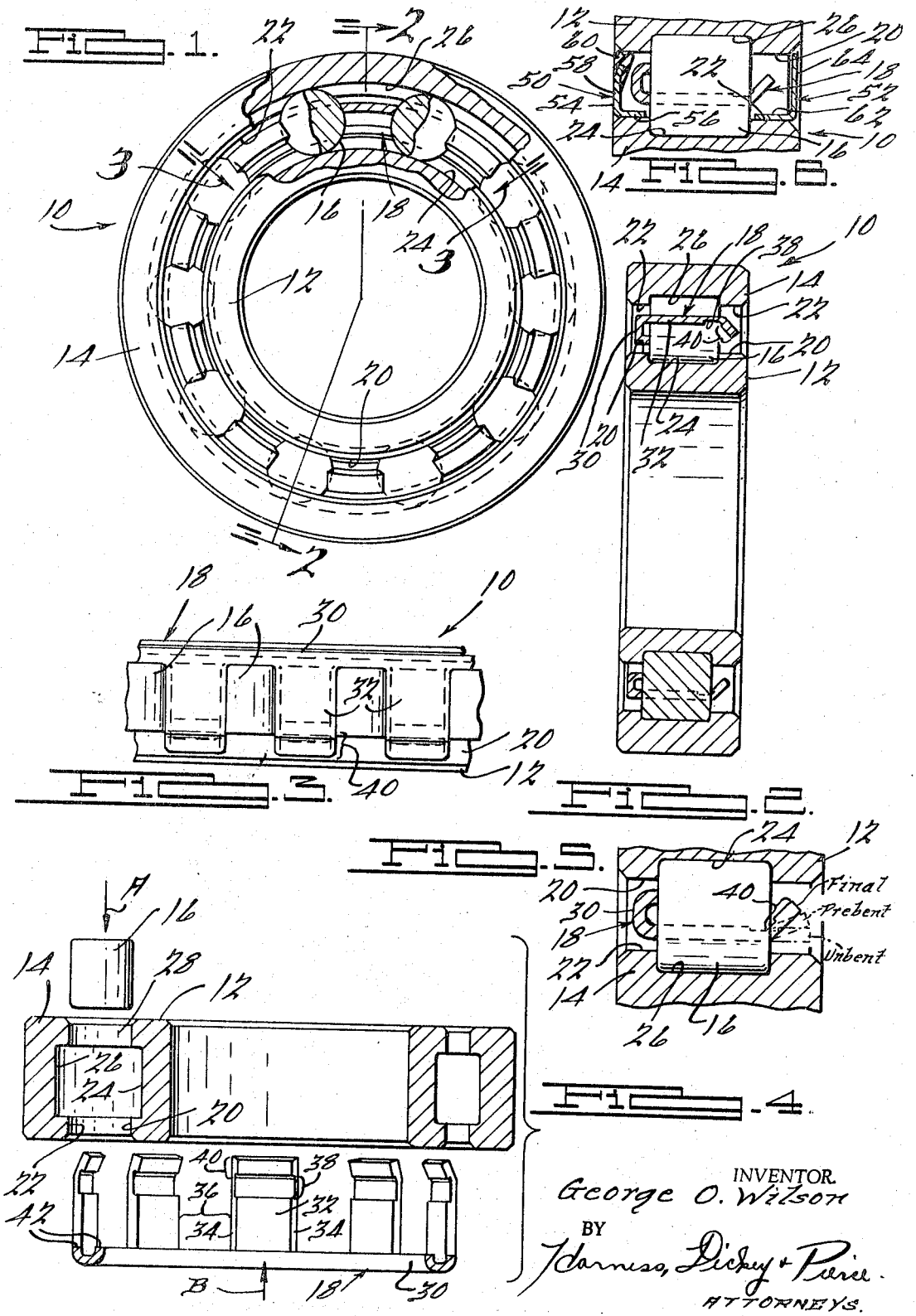

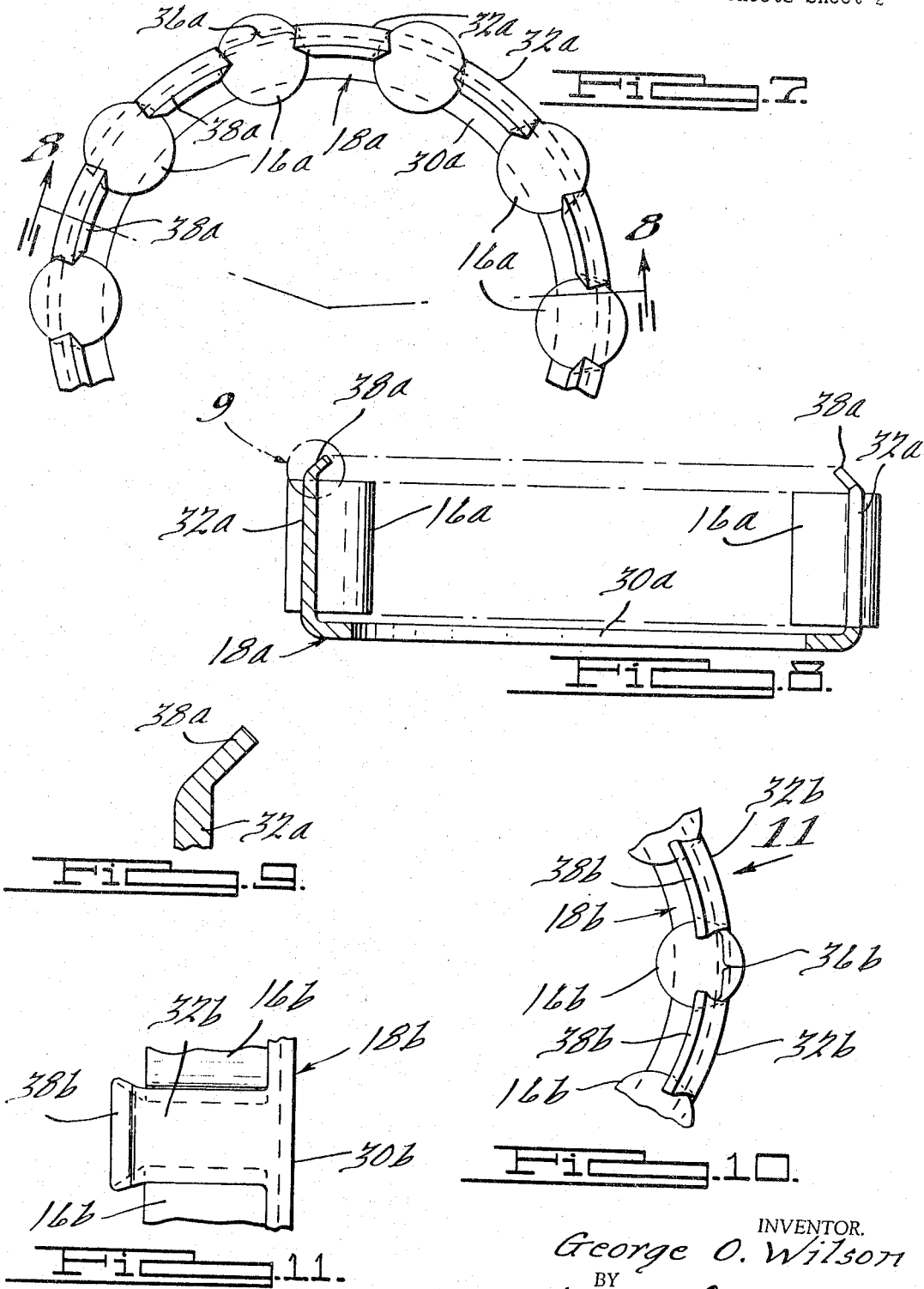

1

3,328,097
BEARING CONSTRUCTION
George O. Wilson, Grosse Pointe Shores, Mich., assignor to Federal-Mogul Corporation, Southfield, Mich., a corporation of Michigan
Filed Oct. 20, 1966, Ser. No. 598,569
9 Claims. (Cl. 308—213)

This application is a continuation-in-part of my co-pending United States patent application, Ser. No. 368,069, filed on May 18, 1964, now abandoned.

This invention relates to bearing constructions.

In the bearing assembly of the present invention a bearing cage is provided which facilitates the assembly of rollers with inner and outer bearing races of a double-shouldered construction. With the present invention a one-half complement of rollers can be assembled in between the double-shouldered bearing races and then retained and circumferentially separated from each other therein by the cage which is assembled after the rollers are in place. The cage of the present invention is relatively inexpensive to make and provides for a relatively inexpensive method of assembling the bearing assembly.

Therefore, it is an object of this invention to provide a new and novel roller bearing assembly of an improved construction.

It is another object of this invention to provide a novel cage construction for use with inner and outer double-shouldered roller bearing races.

It is still another object of this invention to provide a novel, inexpensive bearing cage which permits an inexpensive method of assembling a roller bearing assembly including inner and outer double-shouldered races.

With double-shouldered inner and outer races, the bearing cage of the present invention facilitates and provides clearance for the assembly of seals between the inner and outer races whereby a lubricant can be sealed within the bearing assembly. The cage of the present invention also enhances the lubrication of the bearing rollers. Therefore, it is another object of the present invention to provide a novel bearing retainer for use with double-shouldered inner and outer races and facilitating the use of seals between the races and the lubrication of the rollers.

Other objects, features, and advantages of the present invention will become apparent from the subsequent description and the appended claims, taken in conjunction with the accompanying drawing, in which:

FIGURE 1 is a side elevational view with some parts shown broken away, of a preferred embodiment of a roller bearing assembly embodying features of the present invention;

FIGURE 2 is a sectional view of the bearing assembly of FIGURE 1 taken substantially along the line 2—2;

FIGURE 3 is a fragmentary view of the bearing assembly of FIGURE 1 taken substantially along the line 3—3;

FIGURE 4 is a view showing the mode of assembling the bearing assembly of FIGURES 1-3;

FIGURE 5 is a fragmentary view to expanded scale of a portion of the bearing assembly of the present invention illustrating advantages of the construction and method of assembly of the present invention;

FIGURE 6 is a fragmentary view to expanded scale of a portion of the bearing assembly of the present invention depicted as a sealed bearing;

FIGURE 7 is a side elevational, fragmentary view of a modified form of retainer;

FIGURE 8 is a sectional view of the retainer of FIGURE 7 taken substantially along the line 8—8;

FIGURE 9 is a blown up view of the part of the retainer indicated by the numeral 9;

2

FIGURE 10 is a fragmentary side elevational view of a different form of retainer; and FIGURE 11 is a view of the retainer of FIGURE 10 taken in the direction of the arrow 11.

Looking now to FIGURES 1 through 3, a bearing assembly embodying features of the present invention is generally indicated by the numeral 10 and includes inner and outer races 12 and 14, respectively, a plurality of rollers 16, and a bearing cage or retainer 18. The inner race 12 is of a double-shouldered construction and hence has a pair of annular shoulders 20. The shoulders 20 extend continuously, peripherally and are located at opposite axial sides to define therebetween an inner raceway 24 which is of a width to accept the rollers 16. The outer race 14 is also of a double-shouldered construction and similarly has a pair of continuous, annular shoulders 22 which define therebetween an outer raceway 26 which is of a width to accept the rollers 16. In referring to the shoulders 20, 22 as being continuous it is meant that they are not notched radially or otherwise deformed to permit assembly of the roller members therethrough into the raceways 24, 26.

Since the inner and outer races 12 and 14 are of a continuous double-shouldered construction the rollers 16 can be assembled therewith by first locating the inner race 12 eccentrically within the outer race 14 (see FIGURE 4) and by inserting the rollers 16 in the direction of the arrow A through the enlarged opening 28 at one radial extremity. By properly selecting the height of the shoulders 20, 22 a one-half complement of rollers 16 can be thus assembled with the races 12 and 14. A full complement of rollers would be the maximum number which could be located between inner and outer races with only a slight clearance between rollers: in the latter construction no cage would be used. In the construction of the present invention the cage 18 is used to separate and equally circumferentially distribute the rollers 16 and is assembled thereto after the rollers 16 have been placed between the races 12, 14.

Cage 18 can be stamped from the sheet metal and includes a generally U-shaped or axially bent annular ring or support portion 30 which has a plurality of equally circumferentially disposed fingers 32 extending axially from the radially outer leg thereof. The ring portion 30 provides stiffness to bending of the cage 18. Adjacent ones of the fingers 32 have confronting, radially inwardly inclined side surfaces 34 which define pockets 36 for matably receiving the rollers 16. The confronting surfaces 34 are spaced a distance less than the diameter of the rollers 16, thereby providing an interference with rollers 16 preventing them from moving radially outwardly through the pocket 36.

Each of the fingers 32 has a reduced section, weakened portion 38 defined by a circumferentially extending slot in its radially inner surface. The finger 32 is prebent radially inwardly at the weakened portion 38 along a preselected radial plane to define a tab portion 40. The prebending serves a purpose to be presently described.

Looking now to FIGURE 4, after the rollers 16 have been inserted between races 12, 14 in the manner previously described, the races 12, 14 are moved to be concentric with each other and the rollers 16 are equiangularly spaced circumferentially. Next the cage 18 is oriented coaxially with the races 12, 14 and with the fingers 32 located in line with the spaces between the rollers 16 and is moved axially in the direction of arrow B into engagement with the rollers 16. Note that with the tabs 40 bent radially as described an interference is provided between confronting surfaces on adjacent tabs 40 and the rollers 16. As the cage 18 is thus moved axially the tabs 40 engage the rollers 16 and the fingers 32, being resilient, are moved or deflected radially outwardly to provide the necessary clearance. After the tabs 40 have been moved sufficiently axially to be out of contact with the rollers 16, the fingers 32 resiliently return back to their original positions, thus locking the cage 18 to the rollers 16 and hence permitting handling of the bearing assembly and its use in light duty applications. In the preferred embodiment, however, in order to assure that the bearing cage 18 will not be accidentally forced from the rollers 16 in actual operation, the tabs 40 are bent farther radially inwardly (see FIGURES 2 and 5) along the preselected, radial plane of prebending thereby increasing the interference between tabs 40 and rollers 16.

Note that the initial prebending of tabs 40 is limited such that the fingers 32 will not be substantially permanently deformed during assembly onto the rollers 16 and is further limited to an amount such that the fingers 32 can be resiliently bent radially outwardly sufficiently to permit axial movement relative to the rollers 16 while still maintaining clearance with the shoulders 22 on the radially outer race 14. The initial prebending of tabs 40 also permits and assures the positive location of the plane of bending of the tab 40 at a preselected point relative to the axial surfaces 42 of the U-shaped portion 30 thereby accurately defining the length of the pockets 36 whereby the pockets 36 have the proper clearance relationship with rollers 16. By providing a reduced section portion 38 at the plane of bending of the tab 40, initial and final bending is facilitated, final bending is assured of occurring at the proper place, and final bending can be done without permanently bowing the remainder of the finger 32 radially outwardly and away from the roller 16.

In addition to the above, prebending of the tabs 40 serves an additional advantage. Looking now to FIGURE 5, a portion of a bearing assembly is shown with the tab 40 shown in its "unbent," "prebent," and "final" position. Note that if the tabs 40 were not prebent, on assembly there would be very little clearance between the shoulders 22 and the tabs 40 to permit the insertion therebetween of a tool (not shown) for bending the tabs 40; however, with the tabs 40 prebent ample space is provided for access by the tool whereby final bending can be easily obtained.

In FIGURE 6 the bearing assembly 10 is shown as a sealed construction and includes a seal assembly 50 at one end between inner and outer races 12 and 14 respectively, and a shield 52 at the opposite end. The seal assembly 50 includes an annular, generally L-shaped ring member 54 which has an axially extending annular leg portion 56 which seats matably upon the shoulder 22 of outer race 14. An annular radially extending leg portion 58 extends from the axially outer end of leg portion 56 and has an annular, resilient sealing member 60 which is secured at the radially inner extremity of leg portion 58 and which is in engagement with the shoulder 20 of the inner race 12. The shield 52 is generally L-shaped and has an axially extending annular leg portion 62 which seats matably upon the shoulder 22 of outer race 14. An annular radially extending leg portion 64 extends from the axially outer end of leg portion 62 and terminates at its radially inner end proximate the shoulder 20 of inner race 12. The shield 52 provides a slight clearance with the shoulder 20 to permit venting. Note that the leg portion 56 of seal assembly 50 can be located proximate to the rollers 16 and radially spaced from the retainer 18; likewise the leg portion 62 of shield 52 can be located proximate to rollers 16 and radially spaced from the retainer 18. This clearance relationship is important since it permits the use of the seal assembly 50 and shield 52 without necessitating an increase in the width of the races 12 and 14.

The assembly shown in FIGURE 6 could typically be located on a rear axle of a vehicle with the seal assembly 50 facing outboard. Of course, the inner race 12 could be mounted for rotation with the axle shaft and the outer race 14 would be fixed to the axle housing. For applications in which the outer race would rotate the construction of seal assembly 50 and shield 52 would be reversed so that they would mount on the inner races. Note that with the retainer 18 there is ample room for the assembly of the seal assembly 50 and shield 52 between the inner and outer races 12 and 14, respectively. Note also that the retainer 18 facilitates the lubrication of the rollers 16 since there are substantially no obstructions at opposite axial ends to hinder the flow of the lubricant.

Looking now to FIGURES 7 through 9, a modified form of retainer is shown in which components similar to like components in the embodiment of FIGURES 1 through 6 have been given the same numeral designations with the addition of the letter postscript "a."

The retainer 18a includes an annular ring or support portion 30a with fingers 32a extending axially therefrom which define pockets 36a for receiving the rollers 16a. The pockets 36a are narrower than the rollers 16a. Each of the fingers 32a has a reduced section (reduced thickness) end portion 38a and is prebent radially inwardly at the beginning of the end portion 38a. The end portions 38a are prebent an amount to permit installation of the retainer 18a as shown in FIGURE 4. The fingers 32a are sufficiently resilient to permit deflection for assembly. At the same time the bent end portions 38a provide an interference with the rollers 16a to retain them in their respective pockets 36a. Note that the end portions 38a are of a substantially reduced cross-section. This provides two functions. First it provides an abrupt change of cross-section thereby defining the line of bending of the portions 38a and second, by being thinner the extremity of the end portions 38a provide less interference with the rollers 16a on assembly while still permitting the portions 38a to be bent a sufficient amount for retention of the rollers 16a after assembly. This feature also permits assembly where there is only a small amount of clearance with the shoulders of the outer race.

In FIGURES 10 through 11 a modified retainer is shown in which components similar to like components in the embodiment of FIGURES 7 through 9 have been given the same numeral designation with the addition of the letter postscript "b."

The retainer 18a differs from retainer 18a in that the end portion 38b flares outwardly to an increased width. This increased width provides for greater interference for retention of the rollers 16b after assembly. At the same time the axially inward termination of the flared part defined by the increased width itself provides an abrupt change of cross-section and enhances the change defined by the decreased section or thickness.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A bearing assembly comprising an inner race member having a pair of annular, radially outwardly extending, shoulders located at axially opposite sides to define therebetween an inner raceway, an outer race member having a pair of annular, radially inwardly extending shoulders located at opposite axial sides to define therebetween an outer raceway, a plurality of roller members located between said inner and outer race members within said inner and outer raceways, and cage means secured to said roller members for circumferentially separating said roller members from each other, said cage means comprising an annular support portion and a plurality of fingers extending axially from said support portion, confronting side surfaces of adjacent ones of said fingers defining pockets for receiving said roller members with the width of said pockets being less than the diameter of said roller members, each of said fingers having a reduced section portion proximate its free end to define thereat a tab portion with said tab portion being bent radially towards the associated ones of said roller members at said reduced section portion to lock said cage means to said roller members, said reduced section portion defining an abrupt and substantial change in cross-section relative to the section of said fingers preceding said reduced section portion, said reduced section portion having the minimum section of said each of said fingers and being located generally at the axially outer extremity of said rollers.

2. The bearing assembly of claim 1 further comprising a seal assembly located between said shoulders of said inner and outer race members at one axial side and comprising an annular ring member having a generally axially extending leg portion in matable engagement with one of said shoulders with its axially inner end proximate said roller members and radially spaced from said cage means and having a generally radially extending leg portion extending radially towards the other of said shoulders and an annular, resilient seal member secured to the radial extremity of said radially extending leg portion and in sealing engagement with said other of said shoulders.

3. The bearing assembly of claim 1 further comprising a shield member located between said shoulders of said inner and outer race members at one axial side, said shield member having a generally axially extending leg portion in matable engagement with one of said shoulders with its axially inner end proximate said roller members and radially spaced from said cage means and having a generally radially extending leg portion extending radially towards the other of said shoulders and terminating proximate said other of said shoulders to define a slight clearance therewith.

4. The assembly of claim 1 with said reduced section portion being a circumferentially extending groove located generally at the axially outer extremity of said rollers.

5. In a bearing assembly comprising an inner member having an inner raceway, an outer member having an outer raceway, a plurality of roller members located between said inner and outer members within said inner and outer raceways, and cage means secured to said rollers members for circumferentially separating said roller members from each other, said cage means comprising an annular support portion and a plurality of fingers extending axially from said support portion, confronting side surfaces of adjacent ones of said fingers defining pockets for receiving said roller members with the width of said pockets being less than the diameter of said roller members, each of said fingers having a tab portion at its axially outer extremity with said tab portion being bent radially towards the associated ones of said roller members to lock said cage means to said roller members, said tab portion being bent at a connecting portion defining a substantial and rapid change in cross-section relative to the section of said fingers preceding said connecting portion and being located generally at the axially outer extremity of said rollers.

6. The bearing assembly of claim 5 with said connecting portion having a circumferentially extending groove.

7. The bearing assembly of claim 5 with said tab portion having a reduced thickness relative to the thickness of the portion of said finger preceding it.

8. The bearing assembly of claim 5 with said tab portion having an enlarged width at its axially outer extremity and with the change in cross-section at said connecting portion being defined by the transition to said enlarged width.

9. The bearing assembly of claim 8 with said tab portion having a reduced thickness relative to the thickness of the portion of said finger preceding it.

References Cited

UNITED STATES PATENTS 1,613,058    1/1927    Sauer et al. _____ 308—201

MARTIN P. SCHWADRON, *Primary Examiner.*

FRANK SUSKO, *Examiner.*